United States Patent
Danilov et al.

(10) Patent No.: US 11,625,174 B2
(45) Date of Patent: Apr. 11, 2023

(54) PARITY ALLOCATION FOR A VIRTUAL REDUNDANT ARRAY OF INDEPENDENT DISKS

(71) Applicant: EMC IP Holding Company LLC, Hopkinton, MA (US)

(72) Inventors: Mikhail Danilov, Saint Petersburg (RU); Nickolay Dalmatov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/153,602

(22) Filed: Jan. 20, 2021

(65) Prior Publication Data
US 2022/0229568 A1 Jul. 21, 2022

(51) Int. Cl.
*G06F 3/06* (2006.01)
*G06F 11/10* (2006.01)

(52) U.S. Cl.
CPC .......... *G06F 3/0631* (2013.01); *G06F 3/0616* (2013.01); *G06F 3/0619* (2013.01); *G06F 3/0644* (2013.01); *G06F 3/0664* (2013.01); *G06F 3/0689* (2013.01); *G06F 11/1004* (2013.01)

(58) Field of Classification Search
CPC .... G06F 3/0631; G06F 3/0616; G06F 3/0619; G06F 3/0644; G06F 3/0664; G06F 3/0689; G06F 11/1004
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,065,020 A | 5/2000 | Dussud | |
| 6,073,218 A | 6/2000 | DeKoning et al. | |
| 6,108,684 A | 8/2000 | DeKoning et al. | |
| 6,233,696 B1 * | 5/2001 | Kedem ............... | G06F 11/0751 714/E11.034 |
| 6,240,527 B1 | 5/2001 | Schneider et al. | |

(Continued)

OTHER PUBLICATIONS

Non-Final Office Action received for U.S. Appl. No. 16/584,800 dated Mar. 3, 2022, 90 pages.

(Continued)

*Primary Examiner* — Ryan Bertram
(74) *Attorney, Agent, or Firm* — Amin, Turocy & Watson, LLP

(57) ABSTRACT

Allocation of parity data storage extents for a virtual RAID is disclosed. A virtual RAID can be enabled by a virtual storage device pool (VSDP) mapped to a physical storage device pool (PSDP) that can comprise physical extents of physical disks. In an aspect, the physical disks can be co-located, remotely located, or combinations thereof. Mapping of the VSDP can enable allocation of virtual extents in a virtual RAID that can, for example, emulate a RAID4 while still providing parity data storage diversity that can, for example, emulate RAID5, RAID6, etc. Moreover, the disclosed subject matter can support proactive wear leveling, for example, based on historical storage of parity data via an extent, e.g., extents previously used to store parity data. Furthermore, the disclosed subject matter can support active wear leveling.

20 Claims, 10 Drawing Sheets

(56) References Cited

U.S. PATENT DOCUMENTS

| | | |
|---|---|---|
| 6,502,243 B1 | 12/2002 | Thomas |
| 6,549,921 B1 | 4/2003 | Ofek |
| 7,007,044 B1 | 2/2006 | Rafert et al. |
| 7,103,884 B2 | 9/2006 | Fellin et al. |
| 7,389,393 B1 | 6/2008 | Karr et al. |
| 7,577,091 B2 | 8/2009 | Antal et al. |
| 7,631,051 B1 | 12/2009 | Fein et al. |
| 7,636,814 B1 * | 12/2009 | Karr ............... G06F 3/0689 711/143 |
| 7,653,792 B2 | 1/2010 | Shimada et al. |
| 7,664,839 B1 | 2/2010 | Karr et al. |
| 7,680,875 B1 | 3/2010 | Shopiro et al. |
| 7,694,191 B1 | 4/2010 | Bono et al. |
| 7,721,044 B1 | 5/2010 | Chatterjee et al. |
| 7,752,403 B1 | 7/2010 | Weinman, Jr. |
| 7,895,394 B2 | 2/2011 | Nakajima et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,429,514 B1 * | 4/2013 | Goel ............... G06F 11/1076 714/758 |
| 8,479,037 B1 | 7/2013 | Chatterjee et al. |
| 8,495,465 B1 | 7/2013 | Anholt et al. |
| 8,504,518 B1 | 8/2013 | Ghemawat et al. |
| 8,540,625 B2 | 9/2013 | Miyoshi |
| 8,683,205 B2 | 3/2014 | Resch et al. |
| 8,725,986 B1 * | 5/2014 | Goel ............... G06F 3/064 711/209 |
| 8,751,599 B2 | 6/2014 | Tran et al. |
| 8,751,740 B1 | 6/2014 | De Forest et al. |
| 8,751,897 B2 | 6/2014 | Borthakur et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,892,938 B1 | 11/2014 | Sundaram et al. |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,128,910 B1 | 9/2015 | Dayal et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,411,717 B2 | 8/2016 | Goss et al. |
| 9,442,802 B2 | 9/2016 | Hung |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 9,971,649 B2 | 5/2018 | Dhuse et al. |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,089,026 B1 * | 10/2018 | Puhov ............... G06F 3/0665 |
| 10,097,659 B1 | 10/2018 | Rao |
| 10,108,819 B1 | 10/2018 | Donlan et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,387,546 B1 | 8/2019 | Duran et al. |
| 10,496,330 B1 | 12/2019 | Bernat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,628,043 B1 | 4/2020 | Chatterjee et al. |
| 10,644,408 B2 | 5/2020 | Sakai et al. |
| 10,671,431 B1 | 6/2020 | Dolan et al. |
| 10,705,911 B2 | 7/2020 | Vishnumolakala et al. |
| 10,733,053 B1 | 8/2020 | Miller et al. |
| 10,740,183 B1 | 8/2020 | Blaum et al. |
| 10,754,845 B2 | 8/2020 | Danilov et al. |
| 10,761,931 B2 | 9/2020 | Goyal et al. |
| 10,797,863 B2 | 10/2020 | Chen et al. |
| 10,846,003 B2 | 11/2020 | Danilov et al. |
| 10,924,543 B1 | 2/2021 | Chen et al. |
| 10,951,236 B2 | 3/2021 | Chen et al. |
| 11,023,331 B2 | 6/2021 | Danilov et al. |
| 11,150,995 B1 | 10/2021 | Dhoolam et al. |
| 2002/0049883 A1 | 4/2002 | Schneider et al. |
| 2002/0166026 A1 | 11/2002 | Ulrich et al. |
| 2002/0191311 A1 | 12/2002 | Ulrich et al. |
| 2003/0016596 A1 | 1/2003 | Chiquoine et al. |
| 2005/0027938 A1 * | 2/2005 | Burkey ............... G06F 3/0662 711/170 |
| 2005/0071546 A1 | 3/2005 | Delaney et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0212744 A1 | 9/2006 | Benner et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0132543 A1 | 5/2009 | Chatley et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0174968 A1 | 7/2010 | Charles et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0040937 A1 | 2/2011 | Augenstein et al. |
| 2011/0066882 A1 * | 3/2011 | Walls ............... G06F 11/1068 711/170 |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0191536 A1 * | 8/2011 | Mizuno ............... G06F 3/0611 711/114 |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |

(56) References Cited

U.S. PATENT DOCUMENTS

| | | |
|---|---|---|
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0082414 A1 | 3/2014 | Olster |
| 2014/0115182 A1 | 4/2014 | Sabaa et al. |
| 2014/0122745 A1* | 5/2014 | Singh .................. G06F 11/1092 710/2 |
| 2014/0149794 A1 | 5/2014 | Shetty et al. |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380093 A1 | 12/2014 | Molaro et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1* | 1/2017 | Saito .................... G06F 3/0659 |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1* | 4/2017 | Franke ................ G06F 11/3034 |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1* | 6/2017 | Gao ...................... G06F 3/0665 |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0032279 A1 | 2/2018 | Davis et al. |
| 2018/0052744 A1 | 2/2018 | Chen et al. |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1* | 3/2018 | Gao ...................... G06F 3/0644 |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1* | 5/2018 | Ishiyama ............ G06F 11/1076 |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1* | 5/2019 | Gao ...................... G06F 11/2094 |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0266062 A1* | 8/2019 | Borlick ................ G06F 3/0631 |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |

(56) References Cited

U.S. PATENT DOCUMENTS

| | | |
|---|---|---|
| 2021/0019067 A1 | 1/2021 | Miller et al. |
| 2021/0019093 A1 | 1/2021 | Karr et al. |
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Non-Final Office Action received for U.S. Appl. No. 16/403,417 dated Feb. 25, 2022, 100 pages.

Notice of Allowance dated May 16, 2022 for U.S. Appl. No. 16/526,182, 54 pages.

Notice of Allowance received for U.S. Appl. No. 17/333,793 dated Mar. 9, 2022, 39 pages.

Sun et al., "Data Management across Geographically-Distributed Autonomous Systems: Architecture, Implementation, and Performance Evaluation," IEEE Transactions on Industrial Informatics, 2019, 9 pages.

Office Action dated Sep. 3, 2021 for U.S. Appl. No. 16/803,913, 23 pages.

Office Action dated Jan. 25, 2022 for U.S. Appl. No. 16/803,913, 25 pages.

Office Action dated May 27, 2022 for U.S. Appl. No. 16/803,913, 24 pages.

RAID vs. non-RAID Storage—Difference & Comparison, https://www.fromdev.com/2014/01/raid-vs-non-raid-storage-difference.html, pp. 1-4, 2014. (Year: 2014).

Notice of Allowance received for U.S. Appl. No. 16/584,800 dated Jun. 27, 2022, 33 pages.

Notice of Allowance received for U.S. Appl. No. 16/179,486 dated Jun. 8, 2022, 67 pages.

Final Office Action received for U.S. Appl. No. 16/986,222 dated Jun. 17, 2022, 76 pages.

Wu et al., "Improving I/O Performance of Clustered Storage Systems by Adaptive Request Distribution," 2006 15th IEEE International Conference on High Performance Distributed Computing, 2006, pp. 207-217.

Final Office Action received for U.S. Appl. No. 16/538,984 dated Jun. 1, 2022, 114 pages.

Notice of Allowance received for U.S. Appl. No. 17/333,815 dated Jun. 27, 2022, 27 pages.

Final Office Action dated Aug. 31, 2022 for U.S. Appl. No. 16/403,417, 37 pages.

Non-Final Office Action received for U.S. Appl. No. 16/403,417 dated Dec. 6, 2022, 39 pages.

Notice of Allowance received for U.S. Appl. No. 16/986,222 dated Oct. 13, 2022, 37 pages.

Files Controlling User Accounts and Groups. https://access.redhat.com/documentation/en-us/red_hat_enterprise_linux/4, 2012, pp. 1-2. (Year: 2012).

Final Office Action received for U.S. Appl. No. 16/803,913 dated Oct. 26, 2022, 102 pages.

Notice of Allowance received for U.S. Appl. No. 16/745,855 dated Sep. 10, 2021, 37 pages.

Non-Final Office Action received for U.S. Appl. No. 16/526,182 dated Nov. 24, 2021, 83 pages.

Notice of Allowance received for U.S. Appl. No. 16/888,144 dated Nov. 22, 2021, 71 pages.

Non-Final Office Action received for U.S. Appl. No. 16/698,096 dated Jan. 5, 2022, 21 pages.

Non-Final Office Action received for U.S. Appl. No. 16/670,715 dated Jan. 5, 2022, 22 pages.

Non-Final Office Action received for U.S. Appl. No. 16/231,018 dated May 8, 2020, 78 pages.

Notice of Allowance dated May 11, 2020 for U.S. Appl. No. 16/240,193, 24 pages.

Non-Final Office Action received for U.S. Appl. No. 16/228,624 dated Jun. 24, 2020, 65 pages.

Non-Final Office Action received for U.S. Appl. No. 16/240,272 dated Jun. 29, 2020, 64 pages.

Non-Final Office Action received for U.S. Appl. No. 16/228,612 dated Jun. 29, 2020, 62 pages.

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Guo et al., "GeoScale: Providing Geo-Elasticity in Distributed Clouds" 2016 IEEE International Conference on Cloud Engineering, 4 pages.

Guo et al., "Providing Geo-Elasticity in Geographically Distributed Clouds". ACM Transactions on Internet Technology, vol. 18, No. 3, Article 38. Apr. 2018. 27 pages.

Office Action received for U.S. Appl. No. 16/254,073, dated Aug. 18, 2020, 62 pages.

Non-Final Office Action received for U.S. Appl. No. 16/526,142 dated Oct. 15, 2020, 21 pages.

Notice of Allowance received U.S. Appl. No. 16/228,612 dated Oct. 20, 2020, 84 pages.

Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.

Non-Final Office Action received for U.S. Appl. No. 16/010,255 dated Oct. 29, 2020, 65 pages.

Final Office Action received for U.S. Appl. No. 16/240,272 dated Oct. 27, 2020, 42 pages.

Non-Final Office Action received for U.S. Appl. No. 16/399,902 dated Oct. 28, 2020, 83 pages.

Notice of Allowance received for U.S. Appl. No. 16/374,726 dated Nov. 20, 2020, 78 pages.

Final Office Action received for U.S. Appl. No. 16/228,624 dated Dec. 1, 2020, 63 pages.

Non-Final Office Action received for U.S. Appl. No. 16/570,657 dated Nov. 27, 2020, 75 pages.

Final Office Action received for U.S. Appl. No. 16/177,285 dated Dec. 30, 2020, 61 pages.

Final Office Action received for U.S. Appl. No. 16/511,161 dated Dec. 30, 2020, 61 pages.

Non-Final Office Action received for U.S. Appl. No. 16/399,895 dated Jan. 4, 2021, 64 pages.

Notice of Allowance received for U.S. Appl. No. 16/374,726 dated Jan. 6, 2021, 56 pages.

Non-Final Office Action received for U.S. Appl. No. 16/399,897 dated Feb. 19, 2021, 56 pages.

Non-Final Office Action received for U.S. Appl. No. 16/670,715 dated Mar. 31, 2021, 60 pages.

Final Office Action received for U.S. Appl. No. 16/177,278 dated Feb. 24, 2021, 109 pages.

Dell, "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf, H14071.1, Jun. 2015, pp. 1-21.

Mohan et al., "Geo-aware erasure coding for high-performance erasure-coded storage clusters", Annals of Telemmmunintions, vol. 73, Springer, Jan. 18, 2018, pp. 139-152.

Final Office Action received for U.S. Appl. No. 16/179,486 dated Jan. 28, 2021, 55 pages.

Non-Final Office Action received for U.S. Appl. No. 16/670,746 dated Feb. 16, 2021, 55 pages.

Jarvis, Zhu, "ECS Overview and Architecture", Dell Technologies, h14071.18, Feb. 2021, pp. 1-55.

(56) References Cited

OTHER PUBLICATIONS

EMC; "EMC ECS (Elastic Cloud Storage) Architectural Guide v2.x", URL : https://www.dell.com/community/s/vjauj58549/attachments/vjauj58549/solutions-ch/477/1/h14071-ecs-architectural-guide-wp.pdf, Jun. 2015, 21 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Compul. vol. 72 (2012) pp. 1753-1769.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Final Office Action received for U.S. Appl. No. 16/179,486 dated Oct. 20, 2021, 46 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018)
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year: 2019), Sep. 6, 2019, 4 pages.
Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non- Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.

(56) References Cited

OTHER PUBLICATIONS

Notice of Allowance received for U.S. Appl. No. 16/240,193, dated May 4, 2020, 46 pages.
Final Office Action received for U.S. Appl. No. 16/177,278, dated May 11, 2020, 53 pages.
Office Action dated Apr. 13, 2021 for U.S. Appl. No. 16/781,316, 21 pages.
Office Action dated Nov. 24, 2021 for U.S. Appl. No. 16/538,984, 30 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Feb. 28, 2023 for U.S. Appl. No. 16/403,417, 36 pages.

* cited by examiner

PARITY ALLOCATION FOR A VIRTUAL REDUNDANT ARRAY OF INDEPENDENT DISKS

TECHNICAL FIELD

The disclosed subject matter relates to data storage and, more particularly, to instantiating a virtual redundant array of independent disks (RAID) via extents of a physical storage device pool.

BACKGROUND

Redundant array of independent disks (RAID) is a common technology employed in data storage systems. RAID storage techniques, often referred to as RAID levels, can have distinctive storage and/or parity characteristics. Some common examples of RAID levels can be RAID0, RAID1, RAID3, RAID4, RAID5, RAID6, etc., of which RAID4, 5, and 6, are some of the more commonly practiced RAID levels. RAID4 can consist of block-level striping across a group of physical disks comprising a dedicated parity disk, for example, at 342 of FIG. 3. RAID4 can be associated with performance issues that can be a result of unsatisfactory load balancing. In RAID4 all parity data typically is stored via a single physical disk of the group of physical disks. Additionally, where parity data is generally updated more frequently than normal data, this can lead to increased wear of storage elements of the dedicated parity disk. RAID5 can seek to address these known issues of RAID4. Namely, in RAID5, parity is distributed, typically as a block-level diagonal parity data stripe across the group of physical disks, for example, at 340 of FIG. 3. Distribution of the parity data among the group of physical disks therefore can result in distribution of the wear associated with the greater level of updating the parity data. RAID6 then can extend RAID5 by adding an additional parity-block stripe. In modern data storage, RAID5 and RAID6 can be the most frequently encountered RAID levels.

DETAILED DESCRIPTION

Figure 1:
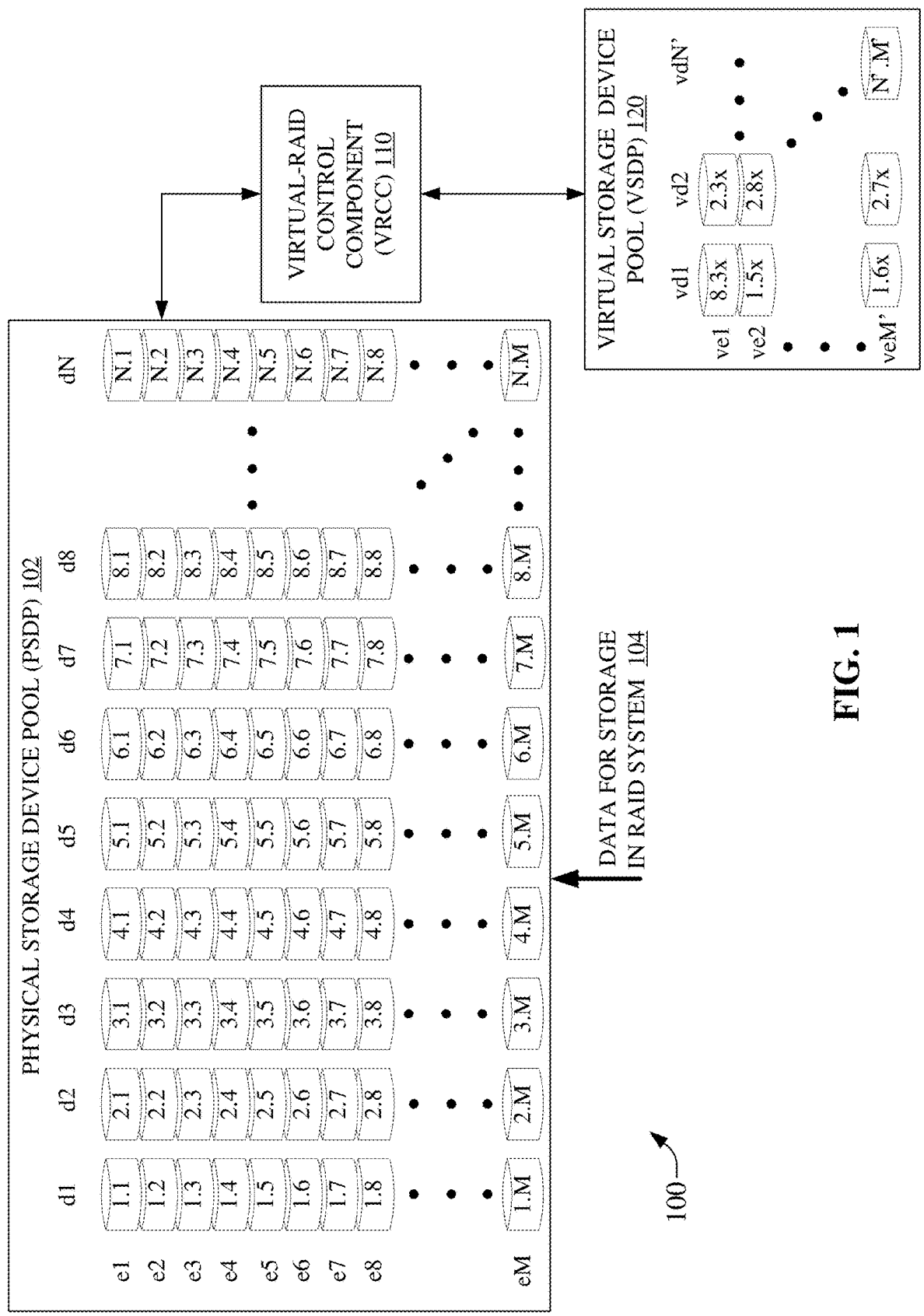
FIG. 1 is an illustration of an example system that can facilitate parity allocation for a RAID storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, a redundant array of independent disks (RAID) can be a common data storage system technology. RAIDs can be, for example, of RAID0, RAID1, RAID3, RAID4, RAID5, RAID6, or various other RAID levels. RAID4 can consist of block-level striping across a group of physical disks comprising a dedicated parity disk, for example, at 342 of FIG. 3. RAID5 can address known issues of RAID4, for example via block-level diagonal parity data stripe distribution across a group of physical disks, for example, at 340 of FIG. 3. Distribution of the parity data among the group of physical disks therefore can result in distribution of the wear associated with the greater level of updating the parity data. RAID6 then can extend RAID5 by adding an additional parity-block stripe. In modern data storage, RAID5 and RAID6 can be the most frequently encountered RAID levels.

In an aspect, data storage techniques can conventionally store data in one or more arrays of data storage devices. As an example, data can be stored in an ECS system such as is provided by DELL EMC. The example ECS system can comprise data storage devices. A data storage device can comprise one or more extent, wherein the sum of the extents of a data storage device represents the storage capacity of the data storage device, e.g., a 128 MB disk can comprise 128 extents, wherein each of the 128 extents can store approximately 1 MB of data. One use of data storage is in bulk data storage. Data can be stored in a group of disks format, for example, in a RAID. Conventionally, a RAID can be an arrangement of a group of physical disks that enable striping normal data and/or parity data across the group of physical disks. In an aspect, this can be termed a 'physical RAID' system.

In an aspect, a 'virtual RAID' (VRAID) can be a virtual embodiment of physical storage devices wherein the virtual embodiment can emulate a physical RAID. In an aspect, a physical storage device pool (PSDP) can comprise a group of disks each comprising extents, e.g., the PSDP can comprise the extents of the disks of the group of disks. It is noted that a PSDP can comprise storage devices other than disks, e.g., solid state drives (SSDs), random access memory (RAM), or other types of data storage, without departing from the scope of the presently disclosed subject matter and, for the sake of clarity and brevity, the term disk is to be regarded as inclusive of nearly any storage device germane to the instant disclosure. Generally, a PSDP can be described as being N disks wide and M extents deep, e.g., a group of 20 drives each having 50 extents can be described as a 20×40 PSDP. A VRAID can comprise some portion of a PSDP via a virtual storage device pool (VSDP) that can be embodied in the N×M PSDP. As an example, a PSDP can be 20×40 and a VSDP can be logically mapped onto the PSDP, for example as a 20×50 VSDP. In an aspect, the virtualization, e.g., mapping of the virtual onto the physical storage devices, can have more or fewer virtual disks and/or virtual extents than the corresponding physical disks/extents, however, for the sake of clarity and brevity, the PSDP can generally be mapped by a same sized VSDP in this disclosure. In the current example, a VRAID can, for example, be 4×4, e.g., four virtual disks wide by four virtual extents deep. As such, it can be readily appreciated that the 20×40 VSDP can support one or more VRAIDs, for example, up to 50 4×4 VRAIDs can fit into a 20×40 VSDP.

In an aspect, a VRAID can comprise contiguous and/or non-contiguous disks/extents. In an example, contiguous virtual disks (vd) and virtual extents (ye) can be allocated for a first example VRAID and can be from vd1.ve1 to vd4.ve4. In another example, non-contiguous vd and ve can be allocated for a second example VRAID, e.g., VRAID 230 of FIG. 2. In this aspect, virtualization of the PSDP as a VSDP that can enable a VRAID can allow for distribution of a both normal data and parity data across physical extents of physical disks according to a mapping to virtual disks and virtual extents, e.g., virtualization can provide great flexibility in storing normal data and parity data. As such, the greater count of updates to parity data can be directed to selectable physical disks/extents via virtual disks/extents mapped into a VRAID. By picking many physical disks for data storage, this can increase data throughput by enabling increase data access parallelism, e.g., accessing twenty pieces of data serially via one real disk can be slower than parallel access to one piece of data from 20 disks. Moreover, wear leveling can be coordinated, for example, by creating new VRAIDs parity stores with physical extents that are less worn.

Figure 10:
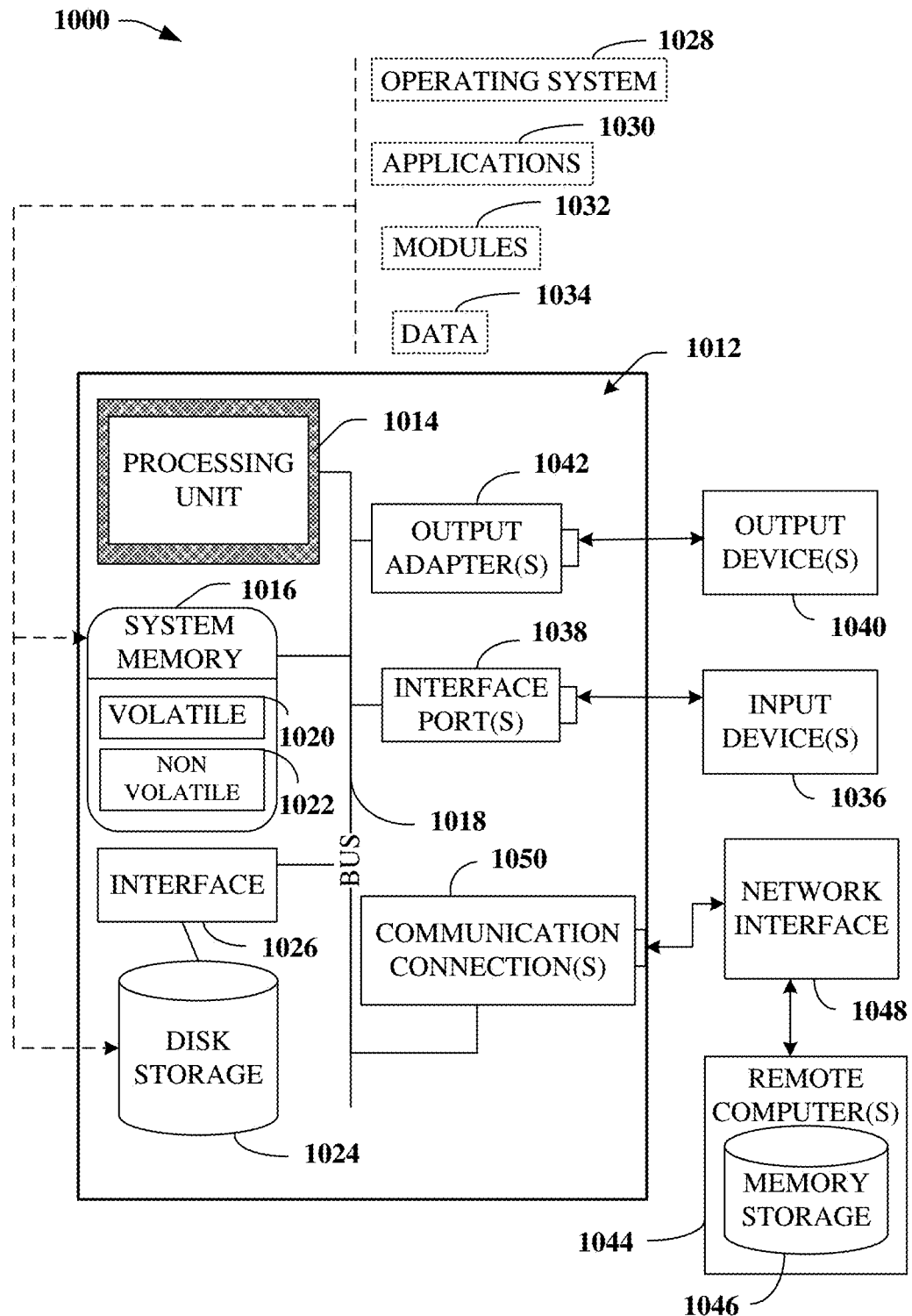
FIG. 10 illustrates an example block diagram of a computing system operable to execute the disclosed systems and methods in accordance with an embodiment.

Interaction with, management of, etc., the PSDP, VSDP, VRAID, or combinations thereof can be via a virtual-RAID control component (VRCC), e.g., VRCC 110, etc. In an aspect, a VRCC can comprise a processor, can be a virtual component executing on a physical processor, etc. As such, the VRCC can support mapping between PSDP elements and VSDP elements, can support allocation of VSDP elements to a VRAID, can receive VRAID criteria, can enable selection of VSDP elements based on the criteria, or nearly any other operation related to operating a VRAID based on VSDP elements mapped to PSDP elements. Accordingly, VRCC can comprise and/or employ various computing resources, e.g., a processor(s), memory(ies), network interface(s), user interface(s), etc., such as are illustrated at FIG. 10, etc. In an aspect, VRAIDs can be distinct from redundant array of independent node (RAIN) technologies, e.g., mapped RAIN, doubly mapped RAIN, etc., that can provide finer grain access to storage in, for example, very large data storage systems, via mapping of extents of disks of nodes of data centers, for storage of data that can be independent of data/parity striping associated with RAID technologies, e.g., despite some similarities RAID and RAIN are typically distinct technologies.

In an embodiment, software, firmware, etc., can hide abstraction of physical storage elements, e.g., a VRAID can appear to have a conventional RAID topology even where it can be an abstraction of PSDP elements that have a topology that would be non-conventional for a RAID, e.g., a VSDP elements mapping to non-contiguous PSDP elements can still appear to be a contiguous RAID even where, for example, the VRAID can be embodied via multiple physical extents of one or more physical disks, across one or more geographic locations, etc. In some embodiments, a VRAID can be forbidden from having two virtual disks corresponding to physical extents of any one physical disk in a PSDP. This rule can harden the VRAID against a failure of the one physical disk triggering a failure of two virtual disks, which can result in a data loss event in some circumstances, which rule is generally referred to as the 'data loss protection' rule. In an example, where a first virtual extent can store data and a second virtual extent can store protection data for the stored data of the first virtual extent, then loss of both the first and second virtual extent can result in a data loss event. Accordingly, it can be a best practice to prohibit VRAIDs from this type of data loss, which can result from mapping the first and second virtual extent to a single physical disk, such that when the single physical disk becomes less accessible, the data of the corresponding virtual extents can become less accessible, which can compromise data stored via the first and second virtual extent where they map to a single physical disk.

In some embodiments, a PSDP can comprise storage space from geographically distributed physical storage devices, e.g., disks in different geographical areas. As an example, a PSDP can comprise storage space from hardware in one or more portions of a data center in Denver. In a second example, a PSDP can comprise storage space from hardware in a first data center in Denver and from a second data center in Denver. As a further example, a PSDP can comprise storage space from hardware in a first data center in Denver and a second data center in Seattle. As yet another example, a PSDP can comprise storage space from first hardware in a first data center in Houston, Tex., and second hardware in a data center in Mosco, Russia. Accordingly, data storage in a first data center located in Seattle, which can be subject to earthquakes, frequent violent political events, etc., and in a second data center located in Kansas, which can be less prone to earthquakes and political events, can physically spread stored data and can mitigate some risks to the data, e.g., risks form earthquake and riots, can be less in Kansas while risks from tornados can be less in Seattle. Numerous other examples are to be readily appreciated by one of skill in the art, and all such examples are considered within the scope of the present disclosure, even where not recited for the sake of clarity and brevity. As such, a VRAID can appear to be a conventional RAID, can level wear, can be flexibly deployed, can provide hardening against some types of data loss, and can provide other benefits over a conventional physical RAID data storage system.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate parity allocation for a RAID storage system, in accordance with aspects of the subject disclosure. System 100 can comprise a physical storage device pool (PSDP) 102, which can comprise disks d1 to dN that can each comprise extents e1 to eM. Data for storage in RAID system 104 can be received and stored, along with corresponding parity data, via storage elements of PSDP 102. In an aspect, data for storage in RAID system 104 can be interacted with via a virtual representation of the actual physical storage of the data for storage in RAID system 104, e.g., virtual storage device pool (VSDP) 120 can be a virtual representation of at least a portion of PSDP 102 that can store data for storage in RAID system 104.

In an aspect, system 100 can further comprise virtual-RAID control component (VRCC) 110 that can facilitate interaction with elements of PSDP 102 according to a virtualization of PSDP 102, e.g., via VSDP 120. As an example, storing data for storage in RAID system 104 at 2.8×, e.g., at a virtual extent (ye) of a virtual disk (vd) such as ve2 of vd2, can be coordinated via VRCC 110 and can correspond to physical storage of data for storage in RAID system 104 at a corresponding physical extent (e) of physical disk (d), namely 2.8 in this example. In an aspect, VRCC 110 can enable one or more VSDP 120 based on PSDP 102, wherein the sum of the storage spaces of said one or more VSDPs can be up to the storage space of PSDP 102.

As is illustrated in system 100, VSDP 120 can map physical extents of physical disks to various virtual extents of virtual disks. As an example, vd1.ve1 of VSDP 120 can map to d8.e3 of PSDP 102, which is represented in VSDP 120 as 8.3×. Moreover, while in some embodiments virtualized extents/disks can be contiguous, other embodiments can comprise non-contiguous elements of PSDP 102. As a non-illustrated example, for a contiguous mapping, ve2.vd2 of VSDP 120 can map to 2.6× based on ve2.vd1 mapping to 1.5×. However, mapping of physical elements in the virtual pool need not be contiguous and, as such, as illustrated, ve2.vd2 of VSDP 120 can map to 2.8× even where ve2.vd1 maps to 1.5×, e.g., non-contiguously. In some embodiments, VSDP 120 can minor PSDP 102.

In some embodiments, elements of PSDP 102 can be located local to other elements thereof, e.g., different disks in a same server rack, etc. In some embodiments, elements of PSDP 102 can be located remotely from other elements thereof, e.g., a disk in Seattle and another disk in Boston. In some embodiments, some elements of PSDP 102 can be local and other elements can be remote, e.g., seven disks in Seattle, nine disks in Boston, ten disks in Milan, four disks in Tokyo, etc. As such, PSDP 102 can provide data security by allowing normal data and corresponding parity data to be stored in a diversified manner. Moreover, storage of data via more disks can provide correspondingly more parallelism for data access. Further, whereas VSDP 120 can facilitate non-contiguous mapping between the physical and virtual storage device pool elements, elements for storing parity data can also be diverse, thereby supporting wear leveling.

Figure 2:
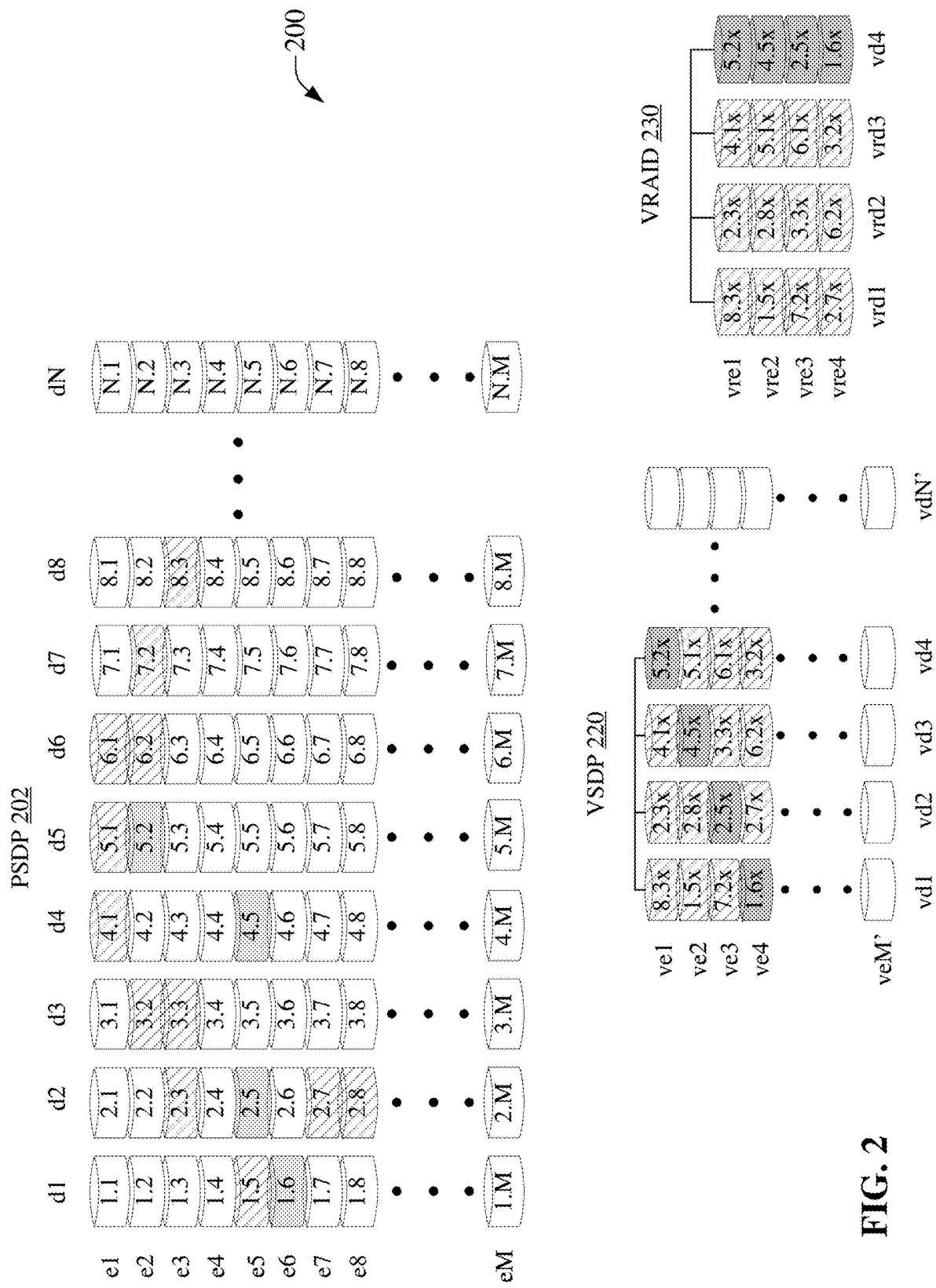
FIG. 2 is an illustration of an example system that can facilitate parity allocation via one or more virtual RAIDs, in accordance with aspects of the subject disclosure.

FIG. 2 is an illustration of a system 100, which can facilitate parity allocation via one or more virtual RAIDs, in accordance with aspects of the subject disclosure. System 200 can PSDP 202 that can be the same as, or similar to, PSDP 102. PSDP 202 can comprise physical disks each having a number of physical extents, e.g., a physical disk can be divided into extents, portions, etc. As an example, a 1 TB SSD can comprise ten 100 GB extents, twenty 50 GB extents, two 500 GB extents, etc.

In an aspect, at least a portion of PSDP 202 can be virtualized via one or more VSDPs, e.g., VSDP 220. As is illustrated in system 200, the hashed and shaded extents of PSDP 202 can be correspondingly represented in VSDP 220. VSDP 220 can illustrate a virtualization of elements of PSDP 202 having a 3+1 RAID5 topology in VSDP 220, e.g., shaded virtual parity extents can be distributed in a diagonal stripe across the virtual disks and can correspond to physical elements of PSDP 202 that do not share the same diagonal striping but are nonetheless distributed parity extents.

In an aspect, a virtual RAID, e.g., VRAID 230, can be supported via VSDP 220. VRAID 230, as illustrated, can embody a RAID4 topology, e.g., vd4 of VRAID 230 can be a virtual parity data storage disk. Illustrated VRAID 230 embodying a RAID4 topology does not present a diagonal parity data stripe that would be typical of a RAID5 topology, however, because VRAID 230 maps non-contiguously to PSDP 202 via VSDP 220, the vd4, while a virtual parity disk, actually stored parity data in a distributed manner, e.g., at 5.2×, 4.5×, 2.5× and 1.6×. Accordingly, interactions with VRAID 230 can employ simple RAID4 topology but still provide parity data distribution that can be similar to RAID5 topologies.

In an aspect, creation of VRAID 230 can be based on selecting portions of VSDP 220 that can employ parity data storage elements in PSDP 202 that can meet a wear leveling rule, a distribution rule, a data loss protection rule, and/or other rules. In an example, selection based on a data loss protection rule can prevent employing more than one extent from a single physical disk in a single extent of a VRAID. In this example, no two disks of vre1 of VRAID 230 can be from the same physical disk of PSDP 202, e.g., vre1 comprises extents from physical disks 8, 2, 4, and 5, which can satisfy the data loss protection rule. However, as a non-illustrated counter example, if vre1 comprises extents from physical disks 8,8, 4, and 5, then this can fail to satisfy the data loss protection rule because failure of physical disk 8 can then result in failure of vrd1 and vrd2 for vre1, in this non-illustrated example, which can lead to a data loss event.

In an example of a wear leveling rule, where physical disk 1.6 has previously been used to store normal data in a previous VRAID, and where physical disk 3.2 has been used to store parity data in another previous VRAID, then selecting a parity disk for VRAID 230 in this example can favor selection of 1.6× for the parity extent of vre4. The preference in this example can be appreciated as being based on preferring to select a less worn physical extent, and where parity storage is typically higher wear, then it can be preferable to select an extent that was not previously employed for parity storage, e.g., where physical disk 1.6 was not previously used for parity storage and physical disk 3.2 was, then it can be preferable to not use disk 3.2× for parity storage in VRAID 230, leaving use of disk 1.6× as preferable for parity storage in this example.

As an example of a distribution rule, it can be preferable to distribute parity storage. Accordingly, it would be less preferred to select extents all from a same physical disk as virtual extents for parity data storage in VRAID 230, e.g., it would be less preferable to select 5.1×, 5.2×, 5.5×, and 5.7× for vd4 in VRAID 230 because this does not distribute the parity data storage well and a failure of physical disk 5 can result in loss of all parity data in vd4 of VRAID 230. However, as is illustrated, vd4 comprises distributed extents for parity data storage, e.g., mapping to physical disks 5.2, 4.5, 2.5, and 1.6. Moreover, where disk 5 can be in Seattle, disk 4 can be in San Jose, disk 2 can be in Cape Town, and disk 1 can be in Paris, the parity disks can also be geographically diverse, which can further provide protection against regional impacting events such as natural disasters, power outages, political unrest, etc.

Figure 3:
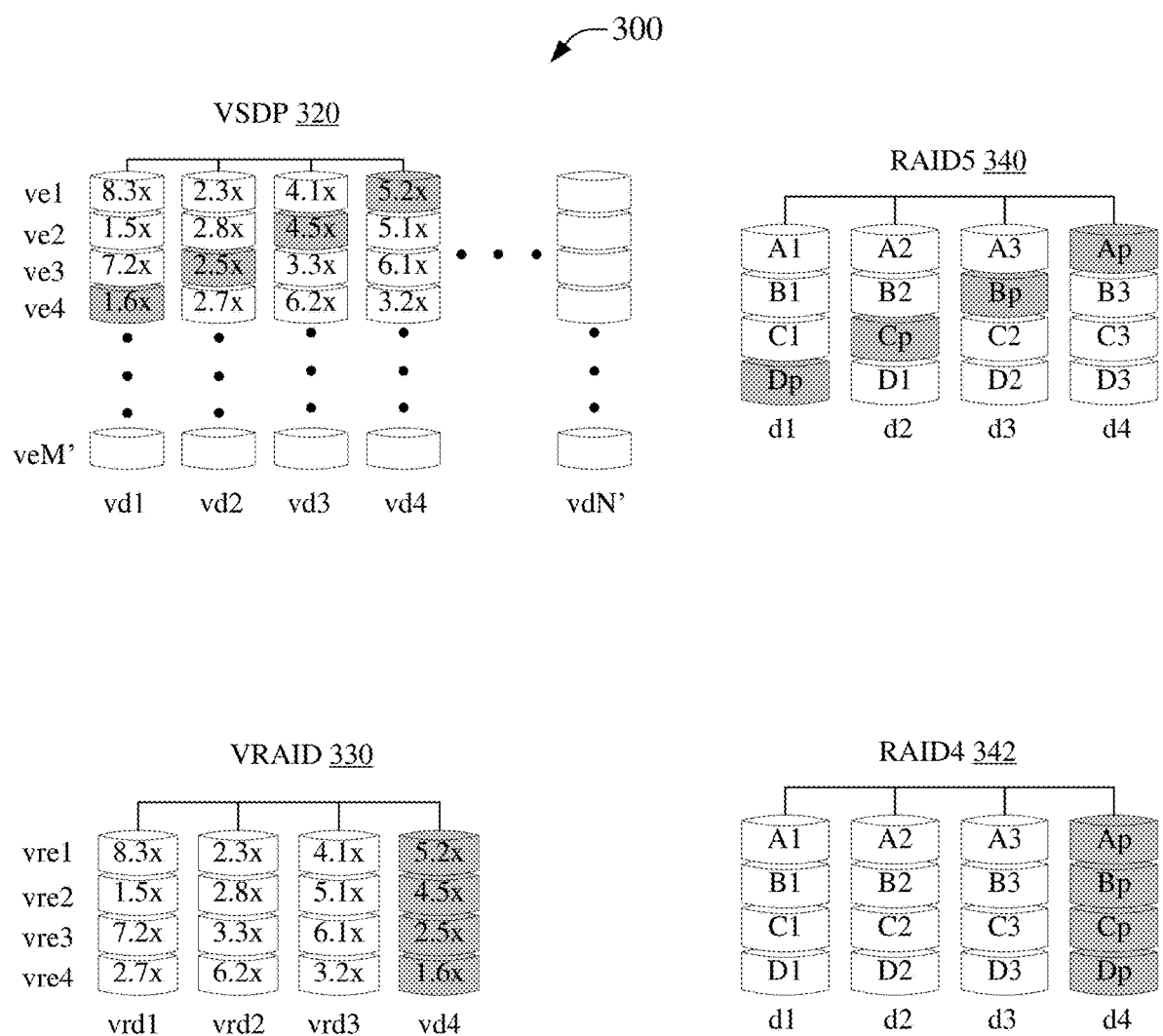
FIG. 3 is an illustration of an example system that can enable parity allocation via one or more virtual RAIDs, wherein a virtual RAID can emulate a RAID4 topology but retain a physical distribution of parity-blocks emulating a RAID5 topology, in accordance with aspects of the subject disclosure.

FIG. 3 is an illustration of a system 300, which can facilitate parity allocation via one or more virtual RAIDs, wherein a virtual RAID can emulate a RAID4 topology but retain a physical distribution of parity-blocks emulating a RAID5 topology, in accordance with aspects of the subject disclosure. System 300 can comprise VSDP 320 that can be a virtualization of physical elements of a PSDP, e.g., PSDP 102, 202, etc. In an aspect, the virtualization of a PSDP as one or more VSDP can enable diversification of extents to be used for parity data storage, e.g., 1.6×, 2.5×, 4.5×, and 5.2× in VSDP 320. It can be observed that the distribution of parity data storage elements in VSDP 320 can mimic a distributed parity block storage elements of a conventional RAID5 topology, e.g., as illustrated in RAID5 340 by Dp, Cp, Bp, and Ap.

Also illustrated in system 300 is VRAID 330 that can be provisioned from virtualized elements of VSDP 320, e.g., VRAID 330 can be comprised of elements of VSDP 320 that can be virtualized from a PSDP. In an aspect, VRAID 330 can map parity data storage elements into vd4. This aspect can result in VRAID 330 emulating a RAID4 topology. As an example, vd4 of VRAID 330 can emulate d4 of RAID4 342, as illustrated, comprising Ap, Bp, Cp, and Dp. In an aspect, VRAID 330 can appear to be a RAID4 topology and be interacted with accordingly. However, in this aspect, the logical arrangement of the virtualized RAID can also provide distribution of parity data storage elements that can be akin to other RAID topologies, e.g., RAID5, RAID6, etc.

Figure 4:
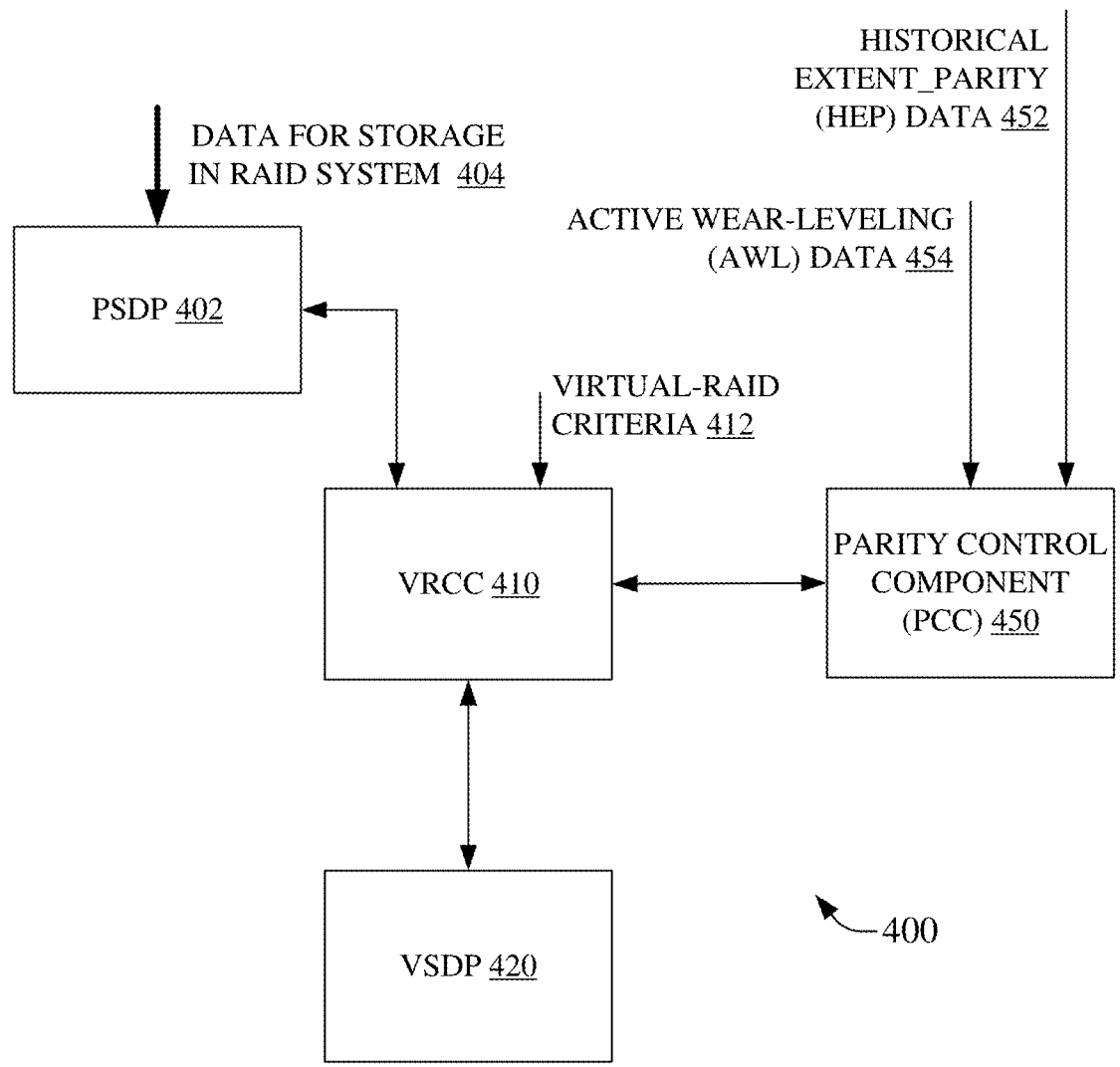
FIG. 4 is an illustration of an example system that can facilitate parity allocation via one or more virtual RAIDs based on historical use of extents of a physical storage device pool for parity storage, in accordance with aspects of the subject disclosure.

FIG. 4 is an illustration of an example system 400 facilitating parity allocation via one or more virtual RAIDs based on historical use of extents of a physical storage device pool for parity storage, in accordance with aspects of the subject disclosure. System 400 can comprise PSDP 402 that can store data for storage in RAID system 404. PSDP 402 can be virtualized as VSDP 420 via VRCC 410. As such, elements of PSDP 402 can be represented in VSDP 420 despite any geographic diversity in PSDP 402. Moreover, virtualization in VSDP 420 can enable use of elements of PSDP 402 either contiguously and/or non-contiguously. In an aspect, a VRAID can be provisioned from VSDP 420 based on virtual-RAID criteria 412, which can comprise a criterion such as VRAID size, VRAID dimension, e.g., N'×M', VRAID parity level, e.g., one parity block/stripe, two parity blocks/stripes, more than two parity blocks/stripes, or other VRAID criteria.

VRCC 410 can communicate with parity control component (PCC) 450, which can enable selection of, and/or interaction with, parity elements of VSDP 420, e.g., via a VRAID built on VSDP 420, etc. In an aspect, PCC 450 can enable selection of virtual parity data storage elements corresponding to physical storage elements of PSDP 402 that can be used to store parity data. This can be based, for example, in part on historical extent_parity (HEP) data 452. HEP data 452 can reflect historical use of storage elements in relation to storing parity data. As an example, an element (s) of physical disks/extents can be associated with a counter indicating use for parity data storage, an amount of wear to the element(s) due to normal data storage and/or parity data storage, or other information that can be correlated to HEP. In an aspect, HEP data 452 can be employed to increment or decrement a rank of an element(s) in relation to being selected for use in storing parity data for a VRAID supported via VSDP 420. As an example, a first real extent that is has historically been heavily worn based on an use for an extended period of time to store parity data can be lower ranked via PCC 450 based on HEP data 452 reflecting the heavy wear. As such, in this example, the first real extent, and correspondingly a virtual extent of VSDP 420, can be less likely to be selected for use as a parity data storage element, e.g., encouraging use of other element(s) for parity data storage to better level storage device wear.

In a further aspect, PCC 450 can receive active wear-leveling (AWL) data 454 that can be employed to actively select alternate element(s) for parity data storage, e.g., where a first storage element is experiencing a high level of wear, for example via extended use as a parity data storage element, etc., a second storage element can be selected via PCC 450 based on AWL data 454. In this example, parity data can accordingly be actively moved from the first element to the second element, or by otherwise rebuilding parity data at the second element, to allow further parity data updates to cause wear on the second element in lieu of the first element. In an aspect, this active wear leveling in a VRAID can be transparent to a user of the VRAID but can be akin to a physical disk swap in a conventional RAID device.

Moreover, VRCC 410 can enable provisioning one or more VRAIDs via one or more VSDPs built on PSDP 402. As such, VRCC 410 can generate VRAIDs on the fly based on user requests that can be embodied in virtual-RAID criteria 412. Additionally, requests to terminate VRAIDs can be processed via VRCC 410. Accordingly, older VRAIDs can be torn down and their elements can be reused in newer VRAIDs spawned over time. In this aspect, HEP data 452 can provide for wear leveling across the lifetimes of a plurality of VRAIDs. Additionally, where there can be long term VRAIDs that are not as easily wear leveled via destruction/creation mechanisms, AWL data 454 can be employed to support wear leveling. Moreover, VRCC 410 can provide for determining that one or more rules are satisfied in relation to provisioning VRAIDs, e.g., diversity of elements to provide greater parallel data access mechanisms, geographic diversity rules, rules for data loss protection, etc.

Figure 5:
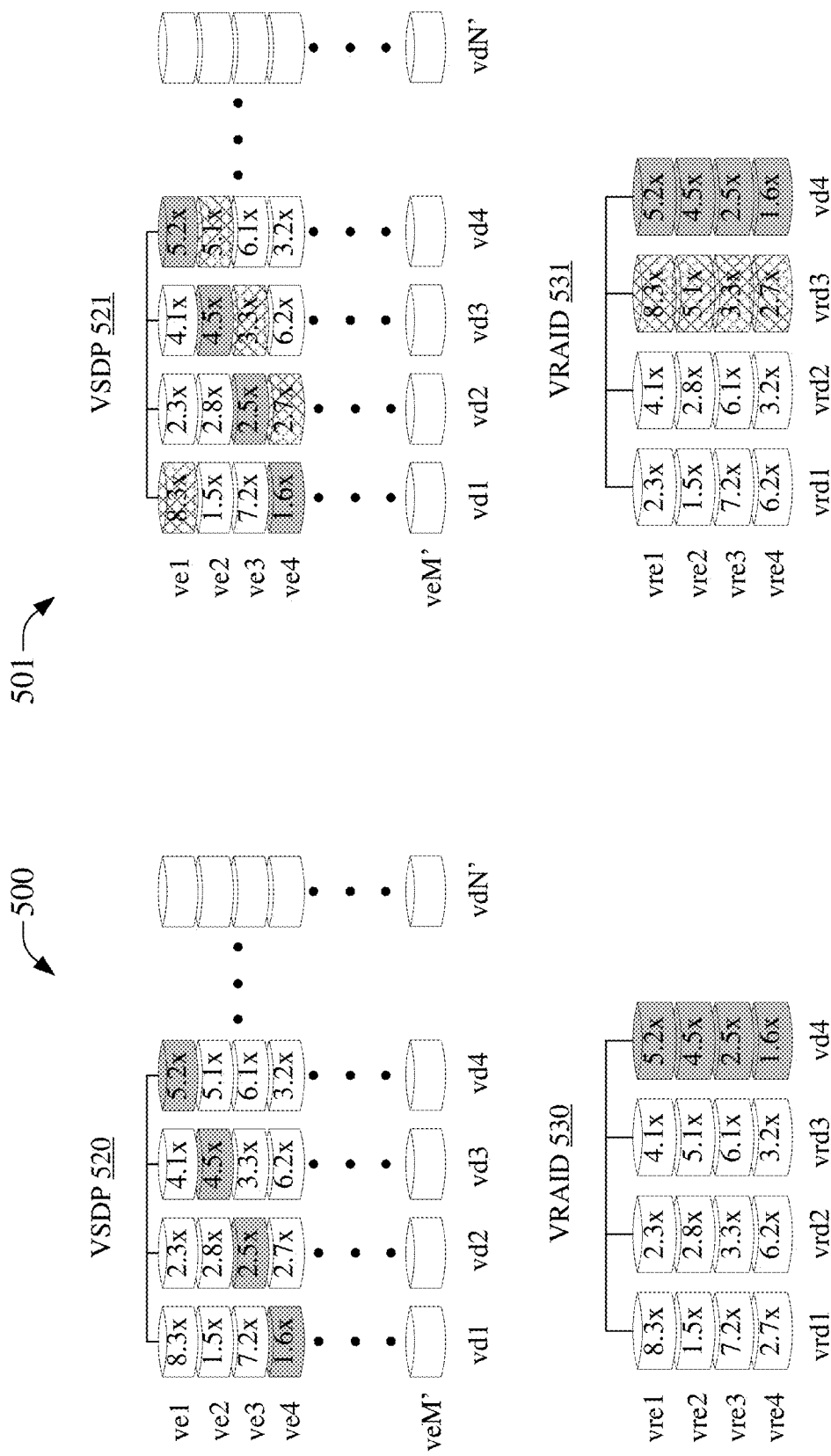
FIG. 5 is an illustration of an example system that can enable parity allocation via one or more virtual RAIDs, wherein a physical distribution of parity-blocks can emulate a RAID6 topology, in accordance with aspects of the subject disclosure.

FIG. 5 is an illustration of example system 500 that can facilitate parity allocation via one or more virtual RAIDs, wherein a physical distribution of parity-blocks can emulate a RAID6 topology, in accordance with aspects of the subject disclosure. System 500 can comprise VSDP 520 that can provide a single parity data stripe, e.g., 1.6×, 2.5×, 4.5×, and 5.2×. In an aspect, VSDP 520 can emulate a RAID5 topology via parity block distribution. In system 500, a VRAID, e.g., VRAID 530, can be built on VSDP 520 and can emulate a RAID4 topology, e.g., vd4 of VRAID 530 can be regarded as a parity data disk even though the mapping of non-contiguous physical extents in vd4 can provide RAID5 type parity data storage diversity. Additional parity stripes can be readily incorporated due to the virtualization of a PSDP, e.g., as VSDP 520 and/or VRAID 530. This can be illustrated in system 501.

In an aspect, system 501 can comprise VSDP 521 that can provide two parity data stripes, e.g., 1.6×, 2.5×, 4.5×, and 5.2× as in system 500, in addition to 2.7×, 3.3.×, 5.1×, and 8.3×. In an aspect, VSDP 521 can emulate a RAID6 topology via parity block distribution of two parity stripes. In system 501, a VRAID, e.g., VRAID 531, can be built on VSDP 521 and, similar to VRAID 530, can emulate a RAID4 topology, e.g., vd3 and vd4 of VRAID 531 can be regarded as parity data disks even though the mapping of non-contiguous physical extents in vd3 and vd4 can provide RAID6 type parity data storage diversity.

Figure 6:
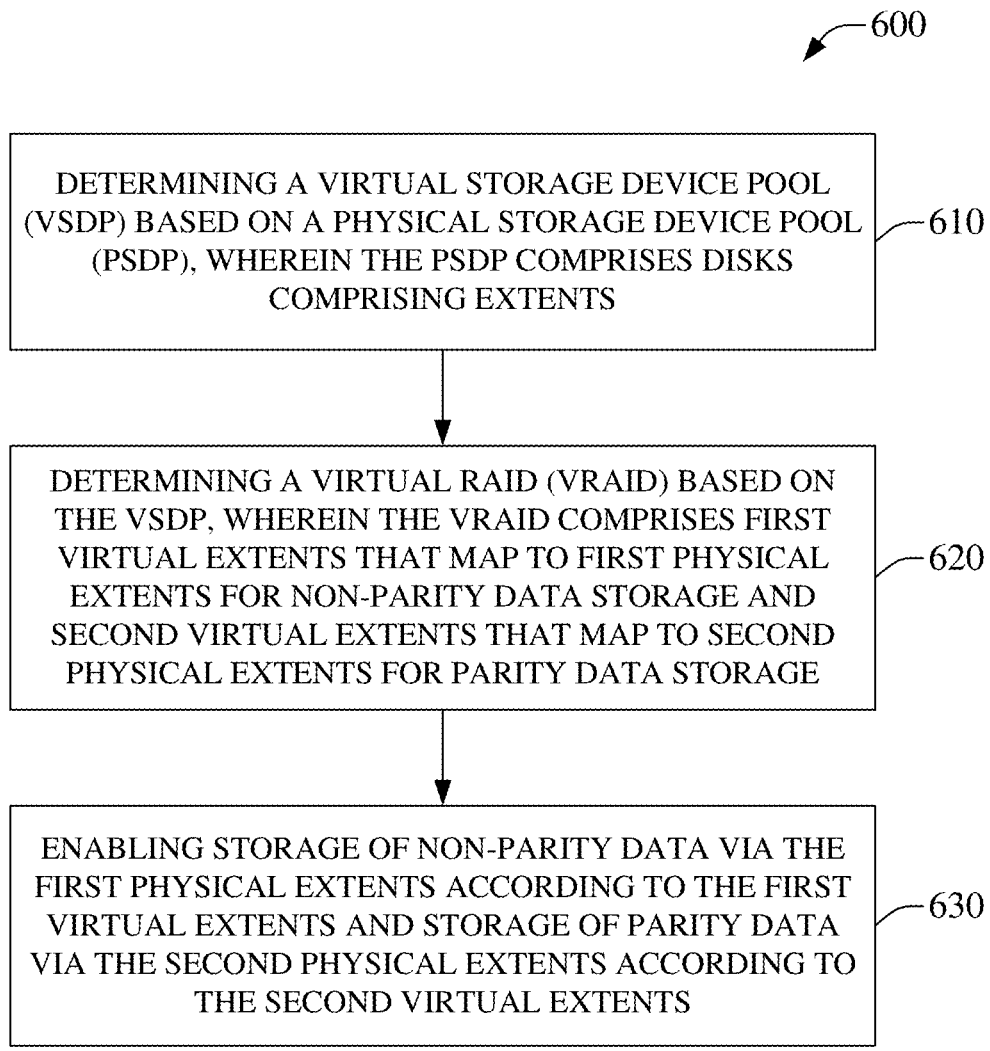
FIG. 6 is an illustration of an example method facilitating parity allocation for a RAID storage system, in accordance with aspects of the subject disclosure.
Figure 7:
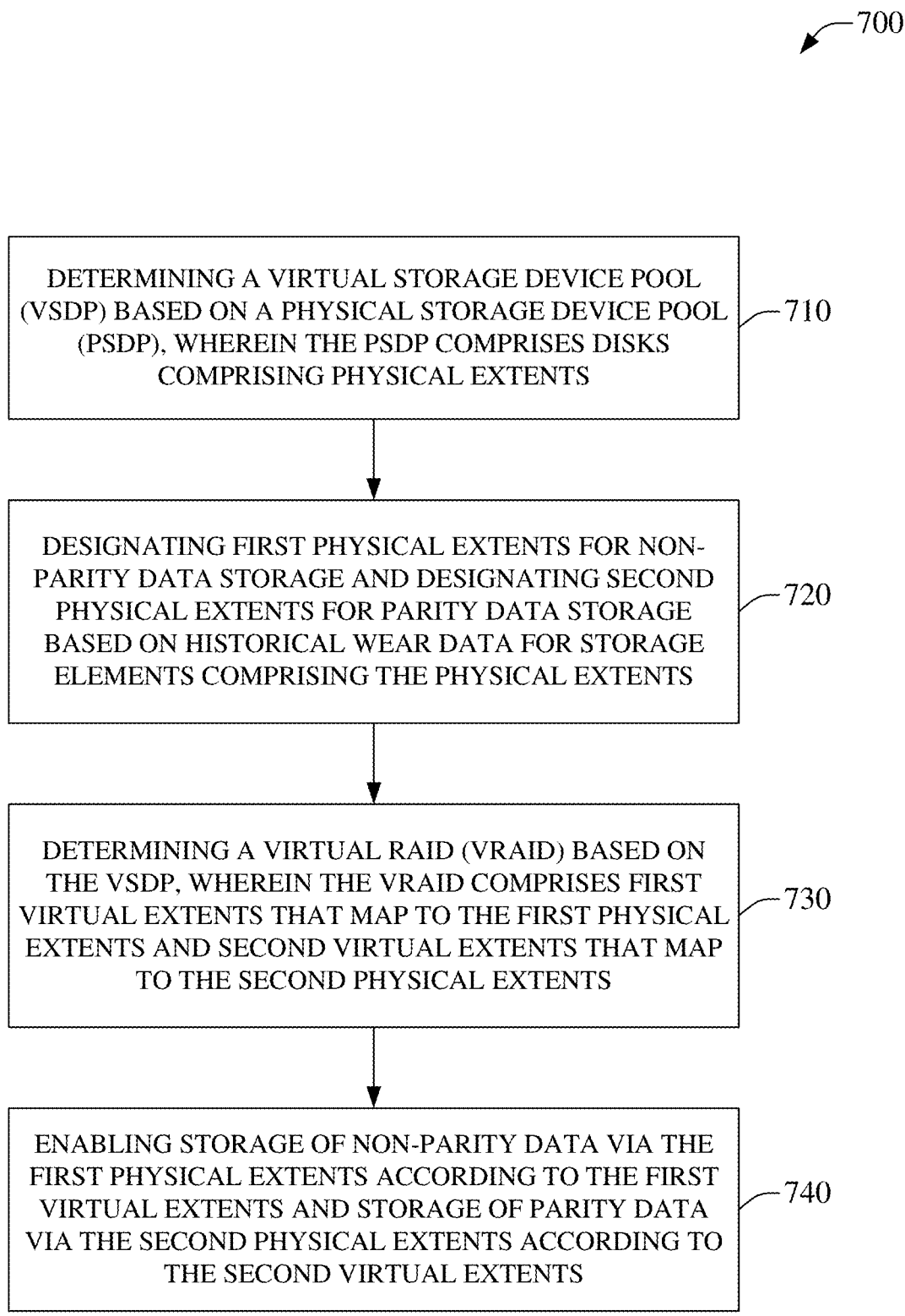
FIG. 7 is an illustration of an example method facilitating parity allocation based on historical wear data for a RAID storage system, in accordance with aspects of the subject disclosure.
Figure 8:
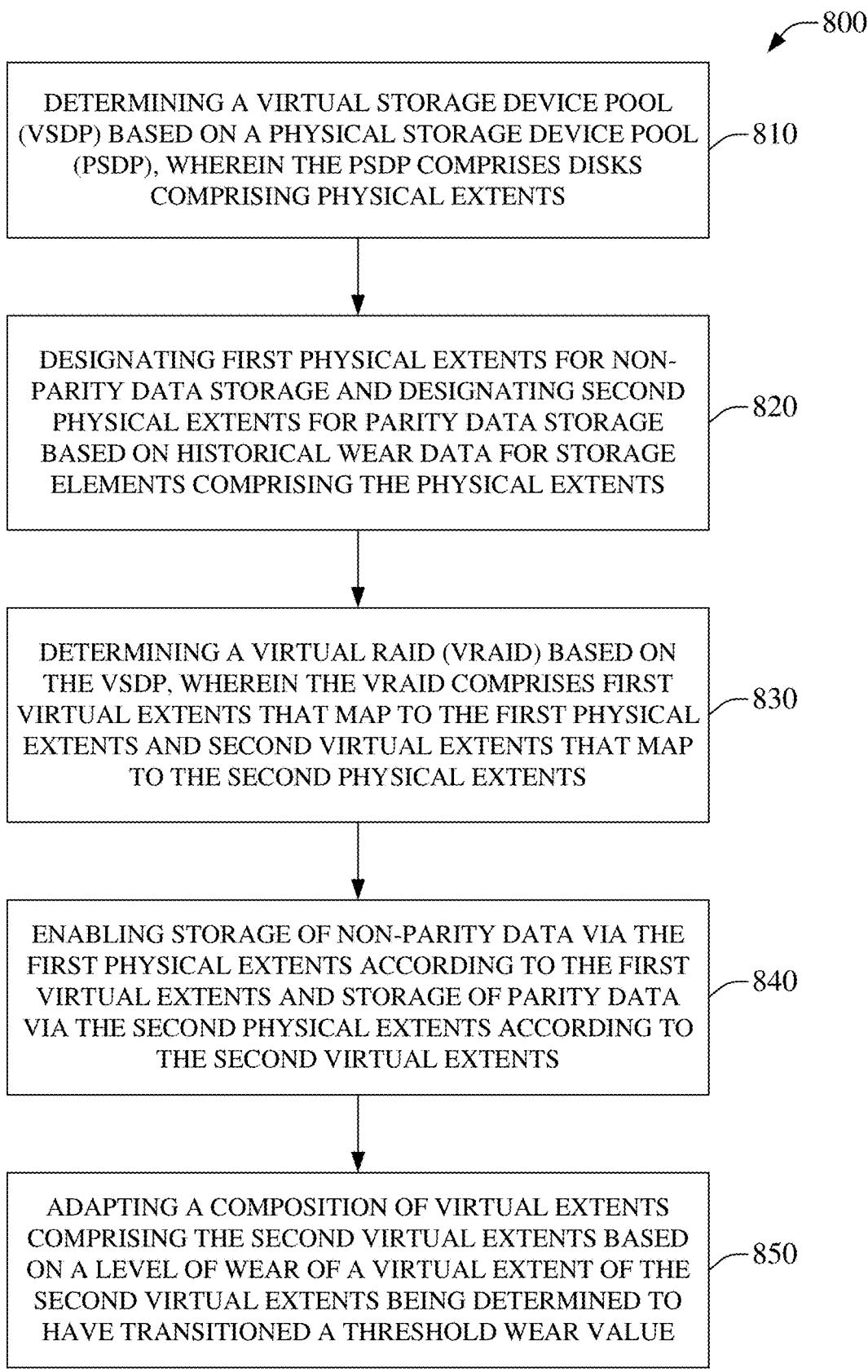
FIG. 8 illustrates an example method enabling parity allocation and active wear leveling for a RAID storage system, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate parity allocation for a RAID storage system, in accordance with aspects of the subject disclosure. Method 600, at 610, can comprise determining a virtual storage device pool (VSDP) based on a physical storage device pool (PSDP), wherein the PSDP comprises physical disks comprising physical extents. In an aspect, PSDP can be the same as, or similar to, PSDP 102, 202, 402, etc. As such, PSDP, at 610, can comprise real physical storage devices that can be co-located, remotely located, or some combination thereof. As an example, PSDP can comprise disks in Seattle, another disk in Boston, and more disks in London. Accordingly, the extents of the geographically distributed disks of the PSDP can provide data resiliency against regional impacts to accessing data on a disk, can support parallel data operations, can enable parity data storage distribution, etc.

At 620, method 600 can comprise determining a virtual RAID (VRAID) based on the VSDP, wherein the VRAID comprises first virtual extents that map to first physical extents for non-parity data storage and second virtual extents that map to second physical extents for parity data storage. In an aspect, VSDP can enable contiguous and/or non-contiguous mapping of PSDP. In an aspect, VSDP can support one or more VRAIDs. At 620, a VRAID can provide a mapping of virtual extents that can emulate a RAID level, for example a VRAID can emulate a RAID4 topology even though the mapping to physical storage elements of PSDP can provide RAID5-like parity diversity, see for example VRAID 230 in FIG. 2, etc.

Method 600, at 630, can comprise enabling storage of non-parity data via the first physical extents according to the first virtual extents and storage of parity data via the second physical extents according to the second virtual extents. At this point method 600 can end. In an aspect, non-parity data, e.g., data for storage in RAID system 104, 404, etc., and parity data can be stored via element(s) of PSDP according to a VRAID supported by VSDP. In an aspect, parity data can be stored by real extents, mapped to virtual extents, which can be correspondingly designated for storage of parity data, e.g., a parity_extent can store parity data, which can enable historical tracking of extents designated for storing parity data. In an aspect, this can enable wear leveling, e.g., by allocating VRAIDs in a manner that balances wear via distributing a parity_extent(s), by active wear balancing, or combinations thereof.

FIG. 7 is an illustration of an example method 700, facilitating parity allocation based on historical wear data for a RAID storage system, in accordance with aspects of the subject disclosure. At 710, method 700 can comprise determining a VSDP based on a PSDP, wherein the PSDP comprises disks comprising physical extents. As in method 600, a PSDP in method 700 can be the same as, or similar to, PSDP 102, 202, 402, etc., and can comprise real physical storage devices that can be co-located, remotely located, or some combination thereof. As such, the extents of the PSDP can provide data resiliency against regional impacts to accessing data on a disk, can support parallel data operations, can enable parity data storage distribution, etc.

At 720, method 700 can comprise designating first physical extents for non-parity data storage and designating second physical extents for parity data storage based on historical wear data for storage elements comprising the physical extents. Extents of the disks of PSDP can be segregated into extents that can store parity data, extents that can store non-parity data, and as yet unassigned extents. This can enable tracking of extents by the type of data they can store, e.g., parity or non-parity. Accordingly, where updating of parity type data storage is typically greater than for non-parity, wear of parity storage extents can be determined to be greater than for non-parity. Where an extent can have already been used to store parity data, a ranking can be decremented such that the extent can be less likely to be reselected for storing parity data in a VRAID. This can therefore act as a metric that can support proactive wear leveling by preferably selecting less worn extents, e.g., extents that have had less previous use storing parity data, for provisioning into a VRAID.

At 730, method 700 can comprise determining a VRAID based on the VSDP, wherein the VRAID comprises first virtual extents that map to the first physical extents and second virtual extents that map to the second physical extents. Mapping of VSDP from PSDP can be contiguous and/or non-contiguous. VSDP can support one or more VRAIDs that can emulate a physical RAID topology and providing parity data diversity. As an example, a VRAID can emulate RAID4 and can provide RAID5, RAID6, etc., parity diversity.

At 740, method 700 can comprise enabling storage of non-parity data via the first physical extents according to the first virtual extents and storage of parity data via the second physical extents according to the second virtual extents. At this point method 700 can end. In an aspect, non-parity data, e.g., data for storage in RAID system 104, 404, etc., and parity data can be stored via element(s) of PSDP according to a VRAID supported by VSDP. In an aspect, parity data can be stored by real extents, mapped to virtual extents, which can be correspondingly designated for storage of parity data, e.g., a parity_extent can store parity data, which can enable historical tracking of extents designated for storing parity data. In an aspect, this can enable wear leveling, e.g., by allocating VRAIDs in a manner that balances wear via distributing a parity_extent(s), by active wear balancing, or combinations thereof.

FIG. 8 is an illustration of an example method 800, which can enable parity allocation and active wear leveling for a RAID storage system, in accordance with aspects of the subject disclosure. At 810, method 800 can comprise determining a VSDP based on a PSDP, wherein the PSDP comprises disks comprising physical extents. Again, as in method 600, a PSDP in method 800 can be the same as, or similar to, PSDP 102, 202, 402, etc., and can comprise real physical storage devices that can be co-located, remotely located, or some combination thereof. As such, the extents of the PSDP can provide data resiliency against regional impacts to accessing data on a disk, can support parallel data operations, can enable parity data storage distribution, etc.

At 820, method 800 can comprise designating first physical extents for non-parity data storage and designating second physical extents for parity data storage based on historical wear data for storage elements comprising the physical extents. As in method 700, extents of the disks of PSDP in method 800 can be segregated into extents that can store parity data, extents that can store non-parity data, and as yet unassigned extents. This can enable tracking of extents by the type of data they can store, e.g., parity or non-parity. Accordingly, where updating of parity type data storage is typically greater than for non-parity, wear of parity storage extents can be determined to be greater than for non-parity. Where an extent can have already been used to store parity data, e.g., based on historical wear data that can track previous use of an extent for parity data storage, a ranking can be decremented such that the extent can be less likely to be reselected for storing parity data in a VRAID. Historical wear data can therefore act as a metric that can support proactive wear leveling by preferably selecting less worn extents, e.g., extents that have had less previous use storing parity data, for provisioning into a VRAID.

At 830, method 800 can comprise determining a VRAID based on the VSDP, wherein the VRAID comprises first virtual extents that map to the first physical extents and second virtual extents that map to the second physical extents. Mapping of VSDP from PSDP can be contiguous and/or non-contiguous. VSDP can support one or more VRAIDs that can emulate a physical RAID topology and providing parity data diversity. As an example, a VRAID can emulate RAID4 and can provide RAID5, RAID6, etc., parity diversity.

At 840, method 800 can comprise enabling storage of non-parity data via the first physical extents according to the first virtual extents and storage of parity data via the second physical extents according to the second virtual extents. In an aspect, non-parity data, e.g., data for storage in RAID system 104, 404, etc., and parity data can be stored via element(s) of PSDP according to a VRAID supported by VSDP. In an aspect, parity data can be stored by real extents, mapped to virtual extents, which can be correspondingly designated for storage of parity data, e.g., a parity_extent can store parity data, which can enable historical tracking of extents designated for storing parity data. In an aspect, this can enable wear leveling, e.g., by allocating VRAIDs in a manner that balances wear via distributing a parity_extent(s), by active wear balancing, or combinations thereof.

At 850, method 800 can comprise adapting a composition of virtual extents comprising the second virtual extents based on a level of wear of a virtual extent of the second virtual extents being determined to have transitioned a threshold wear value, e.g., active wear leveling. At this point method 800 can end. In an aspect, where historical wear data can enable proactive wear leveling via selection of less worn extents as parity data stores in a VRAID, active wear leveling can address adapting which extents are employed by an existing VRAID to store parity data. In an aspect, an existing VRAID can already have been assigned proactively wear leveled extents and can have used those assigned extents to a point where the wear on those extents, resulting from updating parity data, can have transitioned a threshold level. Accordingly, the extents can be updated to transition parity data to a less worn extent, e.g., via active wear leveling. Active wear leveling can be in addition to proactive wear leveling. AS an example of active wear leveling, an existing VRAID that can use a first extent for parity data for a comparatively long period of time can experience threshold levels of wear on the first extent. In this example, a second extent with a low level of wear can be assigned to the existing VRAID and parity data can be transitioned from the first extent to the second extent such that the VRAID with the second extent in lieu of the first extent can comprise less worn extents.

Figure 9:
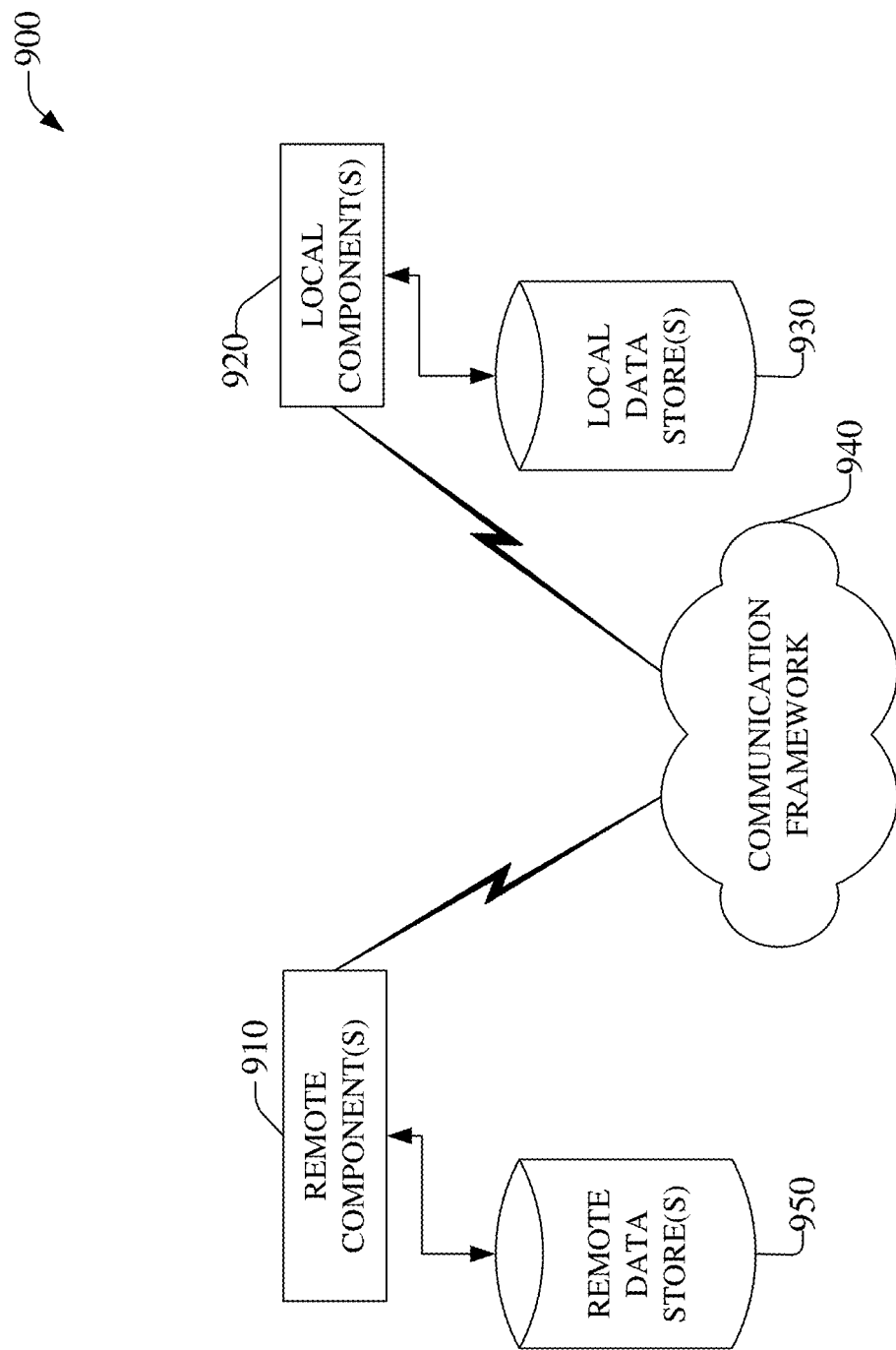
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real physical disks, or extents thereof, in communication with other physical disks that can be located in a different physical location, e.g., in a different city, region, state, country, continent, etc. Communication framework 940 can comprise wired network devices, wireless network devices, mobile devices, wearable devices, radio access network devices, gateway devices, femtocell devices, servers, etc. In an aspect, a PSDP can be comprised of physically disparate devices, e.g., a PSDP can comprise devices in entirely different data centers, different cities, different states, different countries, etc.

The system 900 also comprises one or more local component(s) 920. The local component(s) 920 can be hardware and/or software (e.g., threads, processes, computing devices). In some embodiments, local component(s) 920 can be physical disks, or extents thereof, in communication with other physical disks that can be located in a same physical location, e.g., different disks in a same server rack, same data center, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive (SSD), SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate KPIs, move stored data between local and remote real nodes, such as when a mapping of mapped clusters to a real cluster is updated based on affinity score, etc.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a PSDP 102, 202, 402, etc., comprised in virtual-RAID control component 110, 410, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a VRAID based on a VSDP that is mapped to a PSDP, wherein the PSDP comprises physical disks comprising physical extents, and wherein the VRAID comprises first virtual extents that map to first physical extents to enable non-parity data storage and second virtual extents that map to second physical extents to enable parity data storage. The example operations can further comprise permitting storage of non-parity data via the first physical extents according to the first virtual extents and storage of parity data via the second physical extents according to the second virtual extents.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access;

enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining a virtual storage device pool based on a physical storage device pool, wherein the physical storage device pool comprises physical disks comprising physical extents;
determining a virtual redundant array of independent disks based on the virtual storage device pool, wherein the virtual redundant array of independent disks comprises first virtual extents that map to first non-contiguous physical extents of the physical extents for storage of non-parity data, and comprises second virtual extents that map to second non-contiguous physical extents of the physical extents for storage of parity data, and wherein the first virtual extents and the second virtual extents are not permitted to be drawn from a same physical disk; and
enabling the of the non-parity data via the first non-contiguous physical extents according to the first virtual extents and the storage of the parity data via the second non-contiguous physical extents according to the second virtual extents,
wherein a physical disk of the physical disks is permitted to contribute more than one physical extent to a virtual disk based on the more than one physical extent being determined not to be storing both the parity data and the non-parity data according to the virtual disk.

2. The system of claim 1, wherein the second virtual extents map to the second non-contiguous physical extents based on historical wear data corresponding to the second non-contiguous physical extents.

3. The system of claim 2, wherein the historical wear data comprises a record of storing parity data via a physical extent of the second non-contiguous physical extents.

4. The system of claim 2, wherein an indication that a physical extent of the second non-contiguous physical extents has previously been employed to store at least some of the parity data corresponds to a decrease in a likelihood that the physical extent is going to be again employed to store at least some of the parity data.

5. The system of claim 1, wherein the physical storage device pool comprises a first physical disk and a second physical disk, and wherein the first physical disk is located local to the second physical disk.

6. The system of claim 1, wherein the physical storage device pool comprises a first physical disk and a second physical disk, and wherein the first physical disk is located remotely from the second physical disk.

7. The system of claim 1, wherein the physical storage device pool facilitates diverse storage of a first stripe of parity data.

8. The system of claim 1, wherein the physical storage device pool facilitates diverse storage of multiple stripes of the parity data.

9. The system of claim 1, wherein the virtual storage device pool supports virtual redundant arrays of independent disks comprising the virtual redundant array of independent disks.

10. The system of claim 1, wherein the physical storage device pool enables support of virtual storage device pools comprising the virtual storage device pool.

11. The system of claim 1, wherein each physical extent of the physical extents is identified as belonging to an extent type selected from a group of extent types comprising a parity data extent type, a non-parity data extent type, and an undefined extent type.

12. A method, comprising:
designating, by a system comprising a processor, each physical extent of physical extents, wherein the designating is according to an extent type selected from a group of extent types comprising a parity data extent type, a non-parity data extent type, and an undefined extent type, and wherein a physical storage device pool comprises physical disks that comprise the physical extents;

determining, by the system, a virtual storage device pool based on the physical storage device pool, wherein virtual parity data type extents of the virtual storage device pool are selected from the physical storage device pool in a manner that results in a portion of the physical extents contributing to the virtual storage device pool being distributed among a corresponding portion of the physical disks comprised in the physical storage device pool, and wherein the virtual parity data type extents and corresponding virtual non-parity data type extents are not permitted to correspond to a same physical disk of the physical disks; and facilitating, by the system, storage of non-parity data via first non-contiguous physical extents of the physical extents according to first virtual extents of the virtual parity data type extents; and facilitating, by the system, storage of parity data via second non-contiguous physical extents of the physical extents according to second virtual extents of the virtual non-parity data type extents, wherein a physical disk of the physical disks is permitted to contribute more than one physical extent to a virtual disk in a case where the more than one physical extent does not store both the parity data and the non-parity data according to the virtual disk.

13. The method of claim 12, wherein the designating of each physical extent according to the extent type enabled determining historical extent type data that corresponds to a level of wear for each physical extent, and wherein the historical extent type data is employed in allocating, by the system, the first virtual extents and the second virtual extents to the virtual redundant array of independent disks.

14. The method of claim 12, further comprising shifting, by the system, at least some of the parity data from a first physical extent of the second non-contiguous physical extents to a second physical extent of the second non-contiguous physical extents in response to determining that a wear level corresponding to the first physical extent has transitioned a threshold wear level.

15. The method of claim 12, wherein the facilitating of the storage of at least some of the non-parity data and at least some of the parity data embodies a RAID 4 topology for data operations while maintaining diversity of the second non-contiguous physical extents that store the parity data.

16. A non-transitory machine-readable medium, comprising executable instructions that, when executed by a processor, facilitate performance of operations, comprising:

determining a virtual redundant array of independent disks based on a virtual storage device pool that is mapped to a physical storage device pool, wherein the physical storage device pool comprises physical disks comprising physical extents, wherein the virtual redundant array of independent disks comprises first virtual extents that map to first non-contiguous physical extents to enable non-parity data storage and second virtual extents that map to second non-contiguous physical extents to enable parity data storage, and wherein the first virtual extents and the second virtual extents are prevented from corresponding to a same physical disk of the physical disks; and permitting storage of the non-parity data via the first non-contiguous physical extents according to the first virtual extents and storage of the parity data via the second non-contiguous physical extents according to the second virtual extents, wherein a physical disk of the physical disks is permitted to contribute more than one physical extent to a virtual disk so long as the more than one physical extent is determined not to be storing both the parity data and the non-parity data according to the virtual disk.

17. The non-transitory machine-readable medium of claim 16, wherein selection of the second non-contiguous physical is based on historical wear data.

18. The non-transitory machine-readable medium of claim 17, wherein the historical wear data comprises data indicating historical use of the second non-contiguous physical extents to store the parity data corresponding to an increased likelihood of wear among the second non-contiguous physical extents.

19. The non-transitory machine-readable medium of claim 16, wherein the virtual storage device pool supports a group of virtual redundant arrays of independent disks.

20. The non-transitory machine-readable medium of claim 16, wherein each physical extent of the physical extents is identified as belonging to an extent type selected from a group of extent types comprising a parity data extent type, a non-parity data extent type, and an undefined extent type.

* * * * *